United States Patent [19]
Degood

[11] 3,980,172
[45] Sept. 14, 1976

[54] LOW LINE PRESSURE ACCUMULATOR

[75] Inventor: Maynard J. Degood, Grand Rapids, Mich.

[73] Assignee: Rapistan, Incorporated, Grand Rapids, Mich.

[22] Filed: Apr. 9, 1975

[21] Appl. No.: 566,264

Related U.S. Application Data

[63] Continuation of Ser. No. 404,709, Oct. 9, 1973, abandoned.

[52] U.S. Cl................................ 198/781; 193/37; 198/785; 198/790
[51] Int. Cl.²....................................... B65G 13/02
[58] Field of Search.............. 198/127 R; 193/35 R, 193/37; 29/110, 127, 128, 129.5

[56] References Cited
UNITED STATES PATENTS
| | | | |
|---|---|---|---|
| 2,960,749 | 11/1960 | Robertson et al. | 29/127 |
| 3,266,617 | 8/1966 | Forsyth et al. | 198/127 R |

*Primary Examiner*—Evon C. Blunk
*Assistant Examiner*—Joseph E. Valenza
*Attorney, Agent, or Firm*—Price, Heneveld, Huizenga & Cooper

[57] ABSTRACT

A power roller conveyor has a plurality of rollers forming an article propelling and transporting surface. The rollers are powered from beneath by a continuously driven propelling member which has a width substantially less than the length of the rollers and is located midway between the ends of the rollers. The longitudinal axis of each of the rollers is slightly arched whereby each roller, in one rotational position, has driving engagement with the propelling member and, in a diametrically different position, disengages the roller, permitting the conveyor to serve either as a transport conveyor or as an accumulator having low line pressure and capable of automatically shifting from one mode to the other without the necessity for sensors or any other operating mechanisms.

6 Claims, 5 Drawing Figures

LOW LINE PRESSURE ACCUMULATOR

This application is a continuation of application Ser. No. 404,709 filed Oct. 9, 1973 for LOW LINE PRESSURE ACCUMULATOR, now abandoned.

SUMMARY OF THE INVENTION

This invention relates to an accumulator conveyor and more particularly to powered roller type conveyors which are capable of automatically accumulating articles without the use of sensors to detect the presence of articles and to shift the conveyor from transport function to accumulation function or vice versa. It constitutes an improvement over the conveyor disclosed in U.S. Pat. No. 3,266,617 issued Aug. 16, 1966 to Robert E. Forsyth, et al., entitled ACCUMULATING CONVEYOR.

While accumulator conveyors have been known for some time, it has been recognized that there exists a need for a low cost, simple power roll accumulator which is capable of effecting accumulation or transportation and of switching from one mode to the other automatically without the intervention of an operator. Under many circumstances, it is possible to use conveyors which can switch from one mode to the other in which a reasonable degree of impact between the stalled articles and the articles feeding into the accumulation zone or slugged line can be tolerated. Under such circumstances, it is not necessary to provide a deceleration zone to eliminate impact.

The conveyor disclosed in U.S. Pat. No. 3,266,617 provides one approach to this problem. However, the use of the swagged eccentric offset in the rollers involves a costly manufacturing step. Also the offset or swagged areas of the rollers must extend the full width of the belt or propelling member thus creating something akin to a trough in the center of the conveyor rollers. This arrangement restricts the width of the articles which may be carried on such a conveyor if the articles, as transported, are not to be trapped in the median lane or channel formed by the offset portions and, thus, subjected to the vibration incident to travelling over rollers which, because of their shape, will provide a noticeably uneven surface.

Another unsatisfactory characteristic of the conveyor disclosed in U.S. Pat. No. 3,266,617 is its inability to reinitiate transport of the articles when the article restraint is removed, irrespective of the carton weight or belt speed. In the patented conveyor, this has been overcome by adding raised pads or ripples to the belt at spaced intervals to reinitiate rotation of the rollers. While this is necessary with the present invention under some circumstances, it is not necessary for many applications and in such cases, this invention permits it to be dispensed with. When the use of ripples are necessary, this invention materially reduces the vibration or jarring the accumulated articles incident to the passage of a ripple. The effective use of either the present invention or prior art conveyors of the type disclosed in U.S. Pat. No. 3,266,617 is dependent upon proper adjustment of the amount of pressure with which the belt contacts the conveyor rollers. Because of the construction of the rollers of this invention, this adjustment can be made more accurately and rapidly than with previously known conveyors. This invention permits the conveyor to be so adjusted for use in a large number of applications that the entire group of accumulated articles will be discharged without article separation. This is important in maximizing the efficiency of conveyor usage.

This invention provides a different approach to the problem and a different and more effective solution. It has been discovered that effective accumulation can be obtained by arching the longitudinal axis of the roller, thus causing the axis of the roller, at a point midway between its ends, to traverse a circular path about the axis of the roller at its ends. This offset or arch may be so slight that for all practical purposes, it does not result in any vibration or eccentric travel of the articles as they move over the conveyor surface. Furthermore, the total vertical displacement of the top surface of the roller, as it makes a full rotation, is less than the average variation in the smoothness of the roller contacting surface of the articles transported on the conveyor. This arrangement provides a conveyor which will automatically accumulate, generate very low line pressure and can be made to fully automatically reinitiate forward movement when the restraint on the first article is eliminated. This is accomplished without sensor or other roller operating control mechanisms. Further, because of the general smoothness of its conveying surface and the very slight variations in spacing, controlling transportation and accumulation, it has a very low incident of operating noise.

These and other objects and purposes of this invention will be readily understood upon reading the following description and the accompanying drawings.

DETAILED DESCRIPTION OF THE PREFERRED EMBODIMENT

Figure 1:
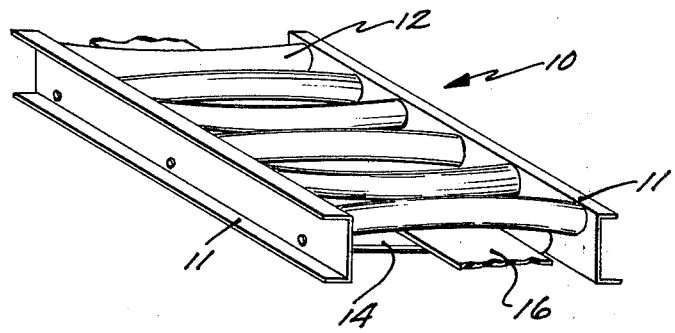
FIG. 1 is a fragmentary oblique view of a section of conveyor incorporating this invention with the degree of eccentricity of the center of the roller greatly exaggerated.

The numeral 10 indicates a length of conveyor of basically conventional construction. The conveyor has a pair of side frame members 11 which are joined together and held in rigidly controlled spaced relationship by suitable cross braces of conventional construction and, therefore, not illustrated. Mounted between the side frame members 11 at equally spaced intervals are a plurality of conveyor rollers 12. The basic construction of these rollers is also conventional in that they consist of a length of tubular material in each end of which a low friction bearing 13 is secured. The bearings 13 support the roller for free rotation about a shaft 15, the ends of which pass through and are secured to the side frame members 11. All of this is conventional construction long used in the conveyor field.

At spaced intervals, beneath the conveyor rollers 12 are pressure wheels 14. Like the conveyor rollers, the pressure wheels 14 are mounted for free rotation upon shafts, the ends of which are supported on the frame members 11. The pressure wheels preferably have a central groove. Between the pressure wheels 14 and the conveyor rollers 12, a propelling member 16 is supported by the pressure wheels. The propelling member is preferably a relatively narrow belt having an upper surface with a high coefficient of friction, as the belt is illustrated in the drawings. It also has a central guide rib 16a engaging the pressure wheel groove to keep it accurately positioned. The propelling member is powered by any suitable means. The propelling member drive mechanism, end pulleys and like structure are not illustrated since they too are conventional and their use in the conveyor industry is old and well-known.

Figure 2:
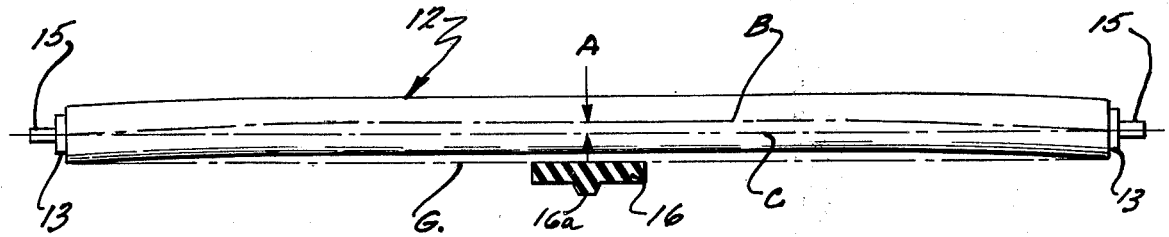
FIG. 2 is an end view of a roller illustrating the relationship of the roller to the propelling member when the roller is in accumulation attitude and again, greatly exaggerating the degree of arch in the roller.

Each of the conveyor rollers 12 is slightly arched between its ends so that its central portion is slightly eccentric or offset with respect to the ends of the roller. This arch is illustrated in FIG. 2 and is represented by the dimension A. The dimension A is the distance the actual central axis B of the roller at the center of the roller is offset from a straight line C interconnecting the centers of the bearings 13 at the ends of the rollers. In actual practice, in a roller of 18 to 36 inches in length, it has been found that rollers which have been arched such that the dimension A is no more than one-sixteenth of an inch, the arch is sufficient to produce the desired accumulation effect. This offset is so small that the resulting eccentricity of the center of the roller is, for all practical purposes, not detectable upon observation of the conveyor while it is either operative or inoperative.

The propelling member 16 is substantially narrower than the length of the rollers. For example, the propelling member is normally 4 to 6 inches in width, the wider one being used with the longer rollers. It is also located midway between the ends of the rollers and, thus, it extends only a short distance on each side of the longitudinal center of the conveyor where the arch is most effective and pronounced. The ends of the shafts 15 of all the conveyor rollers are arranged in a common plane and thus are arranged along a straight line indicated by the line D in FIG. 3.

Figure 3:
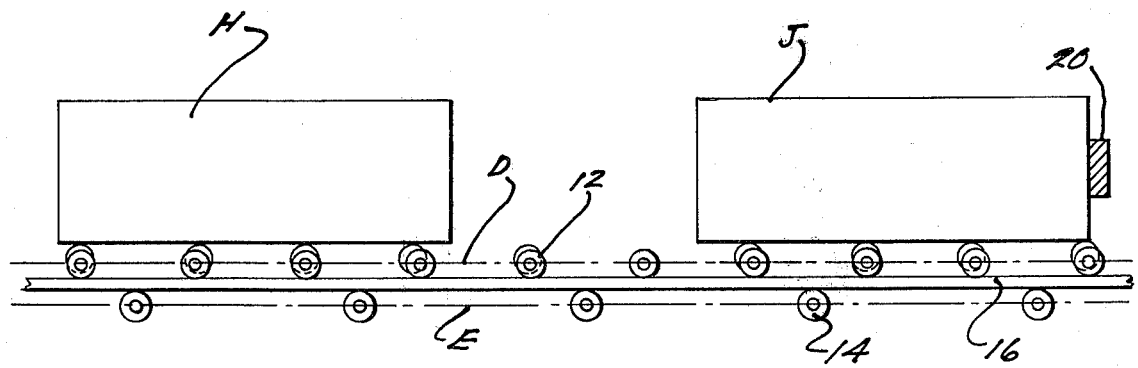
FIG. 3 is a somewhat schematic view of a conveyor incorporating this invention illustrating the positions of the rollers in both accumulation and transportation modes, showing the degree of arch or eccentricity greatly exaggerated.

The pressure wheels 14 are also all arranged in a common plane indicated by the line E in FIG. 3. The plane E is parallel to the plane D. The pressure wheels 14 support the propelling member 16 such that the top surface of the propelling member will be contacted by the conveyor rollers 12 through a substantial portion of their cycle of rotation but will disengage the conveyor rollers when the rollers are in such position that they are arched upwardly or convex. In this position, in effect, the center of the roller is arched away or upwardly from the belt.

The vertical relationship between the surface of the conveyor rollers 12 and the top surface of the belt or propelling member 16 is shown in FIG. 2. In this figure, it will be observed that the top surface of the propelling member is in the same plane G as the surface of the conveyor roller would be, if the conveyor roller were of conventional construction, that is, straight. By this arrangement, the maximum spacing between the roller surface and the belt is that of the offset or arch of the belt, preferably one-sixteenth of an inch. It will be seen that with this spacing, the conveyor rollers 12 have driving engagement with the belt through substantially more than 180° of their rotation which assures effective transportation of the articles when the conveyor is in driving mode.

It will be noted from FIG. 3 that the pressure wheels 14 are never located directly beneath one of the conveyor rollers but are always located midway between two conveyor rollers, thus permitting the propelling member to flex downwardly slightly. This permits the propelling member to give slightly as the crowned or arched portion of the conveyor roller moves through the lower portion of its downward cycle of rotation.

An offset or arch of one-sixteenth of an inch is a preferred value. It will be recognized that an offset somewhat more or less than this can be used. However, it cannot be reduced very much because much below this value would require the use of tolerances which are impractical in conveyor manufacture, if positive disengagement is to be maintained. Increasing the arch much above this value is unnecessary and will make the conveyor surface increasingly uneven and, thus, undesirable.

As illustrated in FIG. 3, the article H is in transportation mode. As a matter of random selection, some of the rollers in contact with the article will be in drive engagement with the propelling member and others will be out of engagement. Those that are engaged with the propelling member will provide adequate propulsion to move the article along the conveyor. Before they lose driving contact with the propelling member, the rollers which had been disengaged will have engaged the propelling member and, thus, a continuity of propelling force will be applied to the article, assuring continuous transportation. Since each roller is subject to some degree of engagement with the propelling member through substantially more than 180° of its rotation there will always be adequate contact between the propelling member and a sufficient number of the rollers to maintain positive article movement.

It will be recognized that there may be occasions during transport mode when all of the conveyor rollers beneath a particular article will be engaged with the propelling member or all may be disengaged from it. When this latter happens, the condition will be momentary at the most and the momentum of the article will rotate the rollers into reengagement with the propelling member. Under normal operating conditions enough of the conveyor rollers 12 beneath any particular article will be in upwardly or almost upwardly arched position at all times, and thus for all practical purposes the article will be moving on a level or substantially level surface, experiencing little or no vertical movement.

As is illustrated in FIG. 3, when an article J is arrested by the presence of a stop 20, as a matter of random selection, some of the rollers in contact with the article will probably be disengaged from the propelling member. These will remain in this position. Those of the rollers which are partially or fully engaged with the propelling member will continue to turn under the influence of the propelling member until they have rotated to a position where they lose sufficient engagement with the belt to continue turning. At this point, a small degree of line pressure will be created but, it will be minor since the roller will establish a position where the frictional engagement with the propelling member is too small to turn the roller against the frictional resistance created by engagement between the article and the roller. At this point, rotation of all of the rollers contacting the article will cease. This condition will continue until the stop is removed.

How much propelling force continues to be applied to the article will depend upon the belt setting. Belt setting is the amount of pressure the belt exerts against the conveyors. This can be increased or decreased by vertical adjustment of the pressure wheels 14. The specific support structure for the pressure wheels, permitting it to be vertically adjusted is neither described nor illustrated, since such structures are well-known and conventionally used on conveyors. The greater the pressure, the longer the arc of rotation of the roller which will have sufficient frictional engagement with the belt to effect movement of the article and the greater the article's resistance to movement must be in order to hold the roller against rotation. As belt pressure is increased, the line pressure exerted by accumulated articles will also increase. The preferred setting is that which will effect automatic, non-singulating discharge of articles when the barrier is removed yet generate a level of line pressure to which the articles are tolerant when the maximum number of articles are accumulated. For a substantial range of article weights and belt speeds, this invention permits this to be done.

Figure 4:
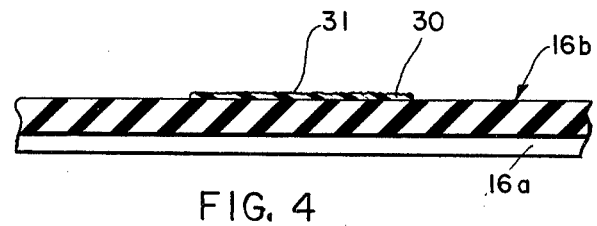
FIG. 4 is an enlarged fragmentary cross section of drive belt equipped with a ripple.

When the conveyor has been adjusted to operate under these conditions, once the stop 20 has been removed, the slight propelling force which has continued to be applied to some of the conveyor rollers 12 beneath the article will be adequate to move the article slightly forward. This is a matter of random selection, and will bring one or more of the rollers into more positive driving engagement with the propelling member and, thus, forward motion of the article will be reinitiated and the article will rapidly accelerate to resume its normal movement along the conveyor. In the case of the accumulation of a number of articles, there will always be a small degree of line pressure which will cause the articles to start moving forward the moment the stop 20 is removed and, thus, all of the articles will reinitiate transportation. Reinstatement of transportation will occur rapidly. This is established by the fact that it has been observed that upon removal of the stop on a conveyor which has been adjusted to so operate, no singulation occurs between the articles, evidencing both automatic and rapid reinstatement of transport mode.

Where the conveyor operating conditions are not such that it is possible to adjust the conveyor to effect both a tolerable level of line pressure and to effect automatic reinstatement of transport mode, a ripple may be used to reinitiate transport. Because of the roller construction of this invention, the ripple may be materially reduced in height over similar devices used in conventional accumulators. This produces several beneficial effects among which are practically complete elimination of vertical movement of the rollers and articles and substantially complete suppression of the noise normally associated with ripple operated conveyors. As will be seen from FIG. 4, the ripple 30 is a very thin strip of material having a ruffened surface 31 which increases the thickness of the belt 16b no more than one-sixteenth of an inch.

A number of tests have been conducted on a conveyor equipped with this invention to determine the line pressure generated and the ability to discharge accumulated loads under various conditions.

All of these tests were conducted on a closed loop of conveyor which included ninety feet of conveyor incorporating this invention. Pop out rollers, 18 inches long and 1.9 inches in diameter at 3 inch spacings were used. Each roller was arched one-sixteenth of an inch at the center. The rollers were driven by a 4 inch wide belt located midway between the ends of the rollers. The belt was operated at 150 feet per minute in all tests excepts Nos. 11 and 12. The rest of the loop included 7 feet of belt slider bed conveyor operated at 170 feet per minute and turntables operated at 176 feet per minute at the center of the carton, to separate the cartons during their return to the 90 foot test section.

In those tests in which a ripple was used, the ripple consisted of a 12 inch long patch of ruff top material adding one-sixteenth of an inch to the belt thickness. The cartons used were 18 by 12 inches, rated for 90 pounds on common carrier freight.

To measure the line pressure, a barrier was placed across the conveyor at the discharge end of the 90 foot test section. The line pressure was measured by a strain gauge load cell mounted on the barrier in such a manner that all of the pressure exerted by the lead carton was imposed on it. The signals from the strain gauge were read on a digital strain indicator.

TEST NO. 1

Figure 5:
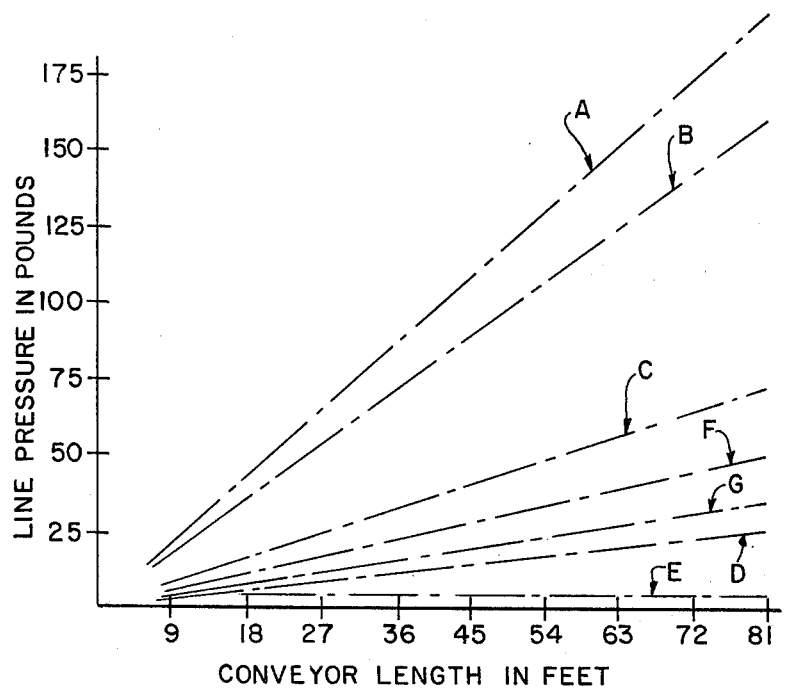
FIG. 5 is a graph illustrating the results of line pressure tests conducted on this invention.

In this test the cartons were each loaded to 75 pounds and the pressure with which the belt contacted the rollers were adjusted to a point just sufficient to assure that all accumulated cartons would start moving without singulation when the barrier was removed. The cartons were introduced to the test section of conveyor in singulated fashion in groups of six until a total of 54 cartons had been accumulated. The line pressure was measured as each group of six cartons (occupying 9 feet of conveyor) had accumulated. The resulting line pressure is tabulated in Table I and is shown by line "A" in FIG. 5. Upon release of the barrier, all of the cartons were discharged without singulation.

TEST NO. 2

In the second test, all of the conditions and procedures were the same as in Test No. 1, except the cartons were loaded to 40 pounds each. The resulting line pressure is tabulated in Table I and is shown by line "B" in FIG. 5. Again, upon release of the barrier, all of the cartons were discharged without singulation.

TEST NO. 3

In this test, all of the conditions and procedures were the same as Test No. 1 except the cartons were loaded to 40 pounds each and the contact pressure between the belt and the rollers was reduced to a point just sufficient to assure that all accumulated cartons would start moving without singulation. The resulting line pressure is tabulated in Table I and is shown by line "C" in FIG. 5. Upon release of the barrier, all of the cartons were discharged without singulation.

TEST NO. 4

In this test, all of the conditions and procedures were the same as in Test No. 3 except the cartons were loaded to 15 pounds each. The resulting line pressure is tabulated in Table I and is shown by line "D" in FIG. 5. Upon release of the barrier, all of the cartons were discharged without singulation.

TEST NO. 5

In this test, all the conditions and procedures were the same as Test No. 3 except every other roller was removed, creating a conveying surface with rollers at inch rather than 3 inch spacing. The resulting line pressure is tabulated in Table I. Upon release of the barrier some carton separation occurred, resulting in 5 percent of the potential carrying surface of the conveyor being unused.

TEST NO. 6

In this test, all of the conditions and procedures were the same as Test No. 4 except every other roller was removed creating a conveying surface with rollers at 6 inch rather than 3 inch spacing. The resulting line pressure is tabulated in Table I. Upon release of the barrier, the same amount of carton separation occurred as was observed in Test No. 5.

TEST NO. 7

In this test, all of the conditions and procedures were the same as Test No. 3 except every third roller was removed creating a conveying surface having pairs of 3 inch spaced rollers spaced 6 inches apart along the conveyor. The resulting line pressure is tabulated in Table I. Upon release of the barrier, the same amount of carton separation occurred as was observed in Test No. 5.

TEST NO. 8

In this test, the same conveyor equipment was used as in Test No. 1 except a single twelve inch long ripple was secured to the belt. The cartons were loaded to 40 pounds each. The contact pressure between the belt and the rollers was reduced to a point capable of maintaining transport of 40 pound cartons once in motion but not capable of initiating motion of a stalled carton. It was observed that the line pressure resulting from passage of the ripple reached a maximum of 7 pounds when 18 cartons had accumulated and this value remained constant as additional cartons accumulated. This result is tabulated in Table II and is shown graphically by the line "E" in FIG. 5. Upon release of the barrier, the cartons separated upon discharge to the extent that only 50 percent of the total transport surface of the conveyor was occupied by cartons.

TEST NO. 9

In this test, all of the conditions and procedures were the same as Test No. 8 except ripples were attached to the belt at 30 foot intervals. It was found that the line pressure varied, depending upon the number of cartons accumulated and the position of the ripple with respect to the barrier. The upper and lower line pressure values are tabulated in Table II and the average line pressure is graphically represented by line "F" in FIG. 5. It was also found that the position of the ripple when the barrier was released affected the amount of carton separation which occurred. The closer the ripple to the barrier at the time of barrier release the less the separation. It was found that the least separation resulted in 2 percent of the conveyor surface being unoccupied and the greatest separation resulted in 10 percent of the conveyor surface being unoccupied.

TEST NO. 10

In this test all of the conditions and procedures were the same as Test No. 9 except the ripples were spaced at 15 foot intervals. Again, line pressure variation was observed, the upper and lower line pressure values are tabulated in Table II and the average line pressure is graphically represented by line "G" in FIG. 5. Again, it was observed that the position of the ripple at the time of barrier release affected the amount of carton separation. The least separation resulted in 5 percent of the conveyor surface being unoccupied and the greatest separation resulted in 50 percent of the conveyor surface being unoccupied.

TEST NO. 11

In this test, all of the conditions and procedures were the same as Test No. 10 except the belt speed was reduced from 150 to 75 feet per minute. The marked reduction in line pressure is shown in Table II. Depending upon the position of the ripple at the time the barrier was released, the amount of carton separation varied from 0 to that which left 50 percent of the conveyor surface unoccupied.

TEST NO. 12

In this test, all of the conditions and procedures were the same as Test No. 9 except the belt speed was reduced from 150 to 75 feet per minute. Again, a marked reduction in line pressure was observed as appears from the tabulation in Table II. Depending upon the position of the ripple at the time the barrier was released, the amount of carton separation varied from 0 to that which left 40 percent of the conveyor surface unoccupied.

TABLE I

| TEST NO. | TOTAL LINE PRESSURE IN LBS. FOR THE NO. OF CARTONS ACCUMULATED | | | | | | | | |
|---|---|---|---|---|---|---|---|---|---|
| | 6 | 12 | 18 | 24 | 30 | 36 | 42 | 48 | 54 |
| 1 | 23 | 46 | 65 | 84 | 110 | 140 | 152 | 180 | 235 |
| 2 | 17 | 35 | 44 | 50 | 76 | 107 | 135 | 149 | 220 |
| 3 | 10 | 19 | 26 | 30 | 35 | 47 | 59 | 65 | 76 |
| 4 | 5 | 10 | 12 | 16 | 17 | 19 | 23 | 28 | 29 |
| 5 | 13 | 17 | 34 | 55 | 61 | 71 | 73 | 73 | 73 |
| 6 | 3 | 14 | 16 | 18 | 26 | 28 | 30 | 35 | 35 |
| 7 | 2 | 6 | 12 | 24 | 42 | 46 | 44 | 70 | 79 |

TABLE II

| TEST NO. | | TOTAL LINE PRESSURE IN LBS. FOR THE NO. OF CARTONS ACCUMULATED | | | | | | | | |
|---|---|---|---|---|---|---|---|---|---|---|
| | | 6 | 12 | 18 | 24 | 30 | 36 | 42 | 48 | 54 |
| 8 | MAX. | 6 | 6 | 7 | 7 | 7 | 7 | 7 | 7 | 7 |
| | MIN. | | | | | | | | | |
| 9 | MAX. | 12 | 15 | 15 | 22 | 30 | 32 | 38 | 52 | 58 |
| | MIN. | 5 | 7 | 11 | 16 | 22 | 26 | 32 | 43 | 47 |
| 10 | MAX. | 10 | 16 | 18 | 25 | 28 | 30 | 38 | 40 | 40 |
| | MIN. | 5 | 8 | 12 | 18 | 20 | 24 | 32 | 35 | 35 |
| 11 | MAX. | 12 | 17 | 18 | 18 | 18 | 18 | 18 | 18 | 18 |
| | MIN. | 3 | 5 | 6 | 7 | 9 | 10 | 10 | 11 | 12 |
| 12 | MAX. | 11 | 14 | 17 | 23 | 25 | 25 | 26 | 27 | 27 |
| | MIN. | 3 | 8 | 10 | 14 | 16 | 18 | 19 | 20 | 20 |

It will be seen that this invention provides a very simple, quiet and low cost accumulator. It is capable of accumulating articles and of automatically restarting without intervention of an operator. It has no moving parts in excess of the standard powered roller conveyor, and generates a minimum of noise and requires a minimum of service.

Having described the preferred embodiment of my invention, it will be recognized that various modifications may be made without departing from the principles of the invention and such modifications are to be considered included within the hereinafter appended claims unless expressly stated otherwise.

The embodiments of the invention in which an exclusive property or privilege is claimed are defined as follows:

1. A conveyor for accumulating articles with low line pressure, said conveyor having a frame and a plurality of elongated, freely rotatable article carrier rollers forming an elongated conveying surface, a belt propelling member having a width which is a minor portion of the length of the carrier rollers and means supporting said propelling member beneath and substantially midway between the ends of said carrier rollers, said conveyor characterized in that each of said carrier rollers between its ends is of constant diameter and is bowed along its longitudinal central axis to form a shallow arch; means mounting each of said rollers for rotation about an axis which is the chord of said arch, the center of said arch being aligned vertically with the center of said belt propelling member and said propelling member being supported in a plane wherein the upper surface of said propelling member is in driving contact with said carrier rollers when the rotational position of said rollers is such that their longitudinal central axes are concave and said carrier rollers are disengaged from said propelling member when the rotational position of said rollers is such that their central axes are convex.

2. A conveyor for accumulating articles as described in claim 1 wherein said longitudinal central axes of said carrier rollers is a segment of a circle.

3. A conveyor for accumulating articles as described in claim 1 wherein the maximum deviation of the longitudinal central axis of the carrier rollers from a straight line is approximately one-sixteenth of an inch.

4. A conveyor for accumulating articles as described in claim 1 wherein the maximum deviation of the longitudinal central axis of the carrier rollers from a straight line in proportion to the length of the roller is in the range of 1:280 to 1:580.

5. A conveyor for accumulating articles as described in claim 1 wherein some of said carrier rollers in contact with any given article in arrested attitude on said conveyor assumes a rotational position wherein the frictional engagement between said rollers and said propelling member is insufficient to overcome the frictional engagement between said rollers and said article and said rollers remain stationary, the remaining ones of the said rollers in contact with the article being disengaged from said propelling member.

6. A conveyor for accumulating articles as described in claim 1 wherein the propelling member is a belt, said belt being supported with its carrier roller engaging surface positioned substantially midway between the minimum and maximum positions of the surface of the carrier rollers as they rotate whereby the surfaces of the carrier rollers are in driving engagement with the belt surface for substantially more than 180° of rotation, the belt being capable of flexing away from said carrier rollers to accommodate said carrier rollers when the longitudinal central axes of said carrier rollers are concave.

* * * * *

UNITED STATES PATENT AND TRADEMARK OFFICE
CERTIFICATE OF CORRECTION

PATENT NO. : 3 980 172
DATED : September 14, 1976
INVENTOR(S) : Maynard J. DeGood It is certified that error appears in the above-identified patent and that said Letters Patent are hereby corrected as shown below:

Front Page:

Inventor's Name "Maynard J. Degood" should be --- Maynard J. DeGood ---.

Column 8, Line 32:

"18" (2nd occurrence) should be --- 48 ---.

Signed and Sealed this

Twenty-eighth Day of December 1976

[SEAL]

Attest:

RUTH C. MASON
*Attesting Officer*

C. MARSHALL DANN
*Commissioner of Patents and Trademarks*